July 25, 1933.  V. G. OLIVER  1,919,249
POLE GAINING MACHINE
Filed Sept. 21, 1931  3 Sheets-Sheet 1
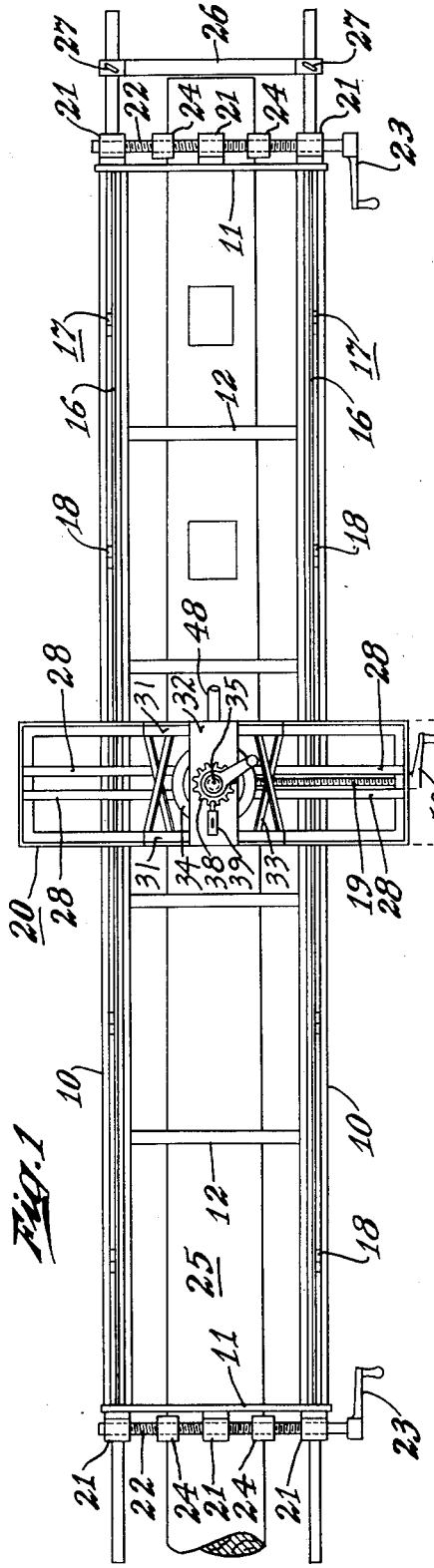
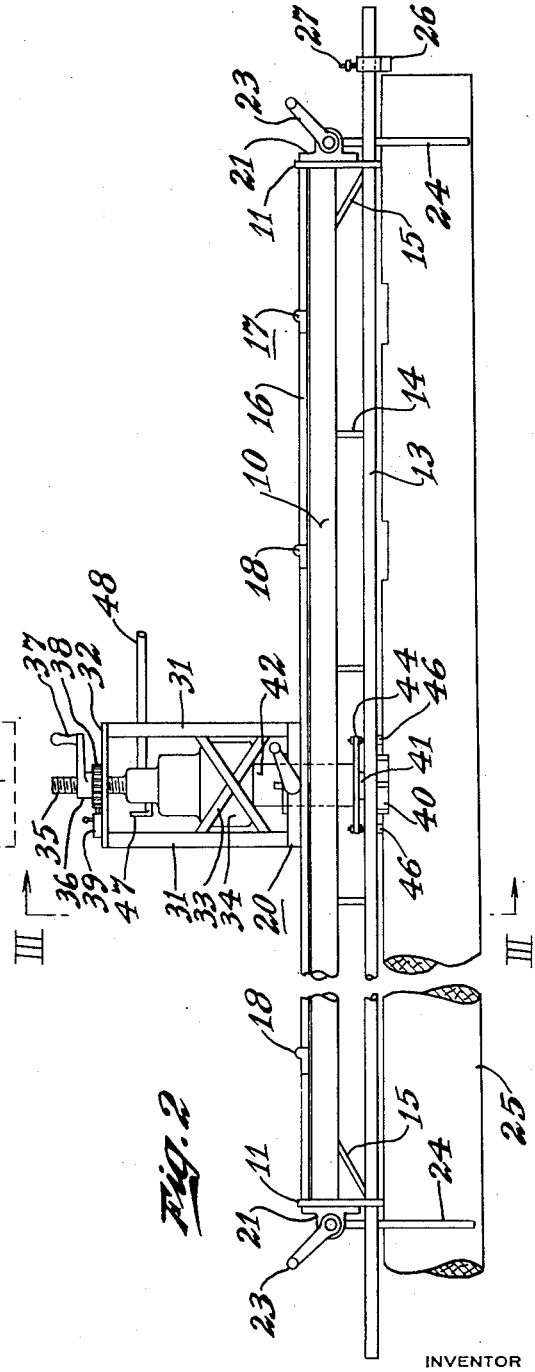
INVENTOR
V. G. Oliver
BY
ATTORNEYS July 25, 1933.  V. G. OLIVER  1,919,249
POLE GAINING MACHINE
Filed Sept. 21, 1931    3 Sheets-Sheet 2
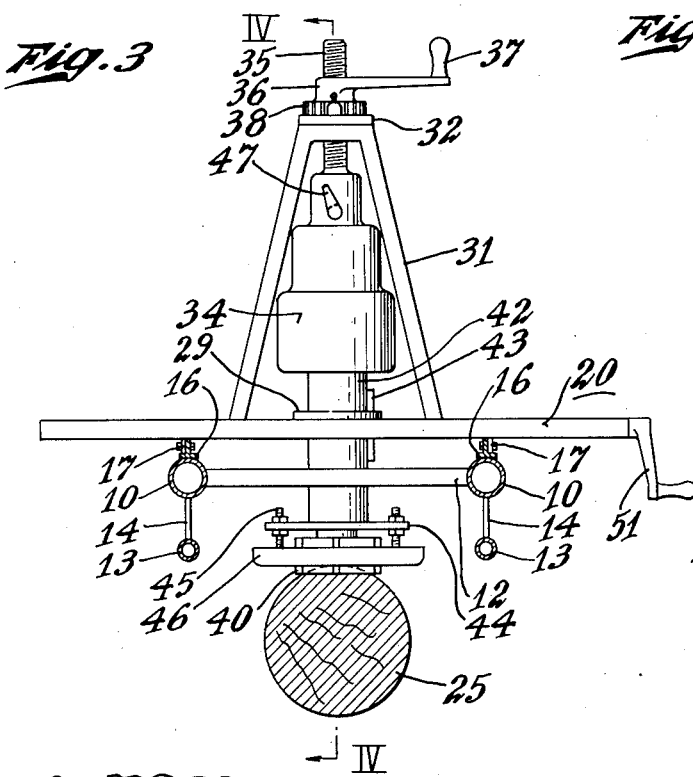
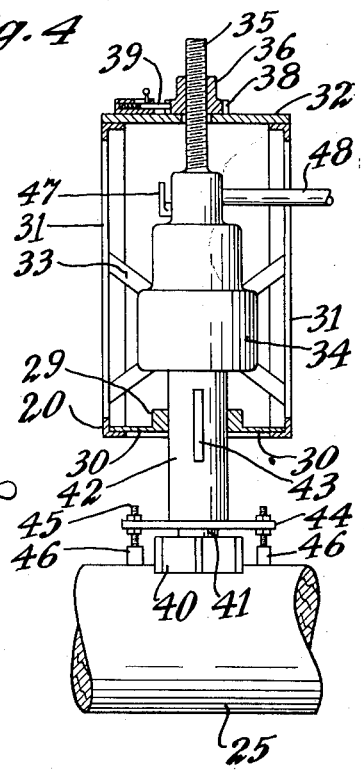
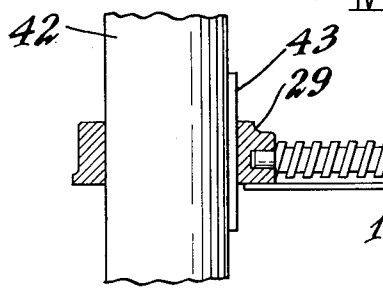
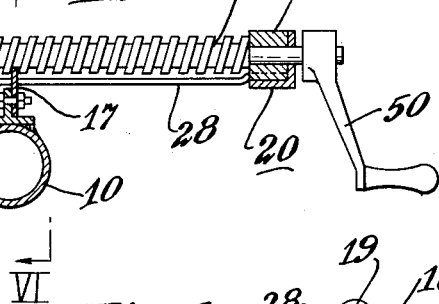
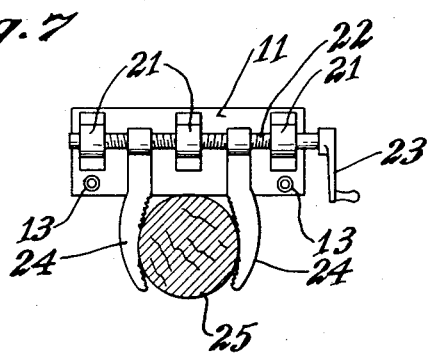
INVENTOR
V. G. Oliver
BY
ATTORNEYS July 25, 1933.  V. G. OLIVER  1,919,249
POLE GAINING MACHINE
Filed Sept. 21, 1931  3 Sheets-Sheet 3
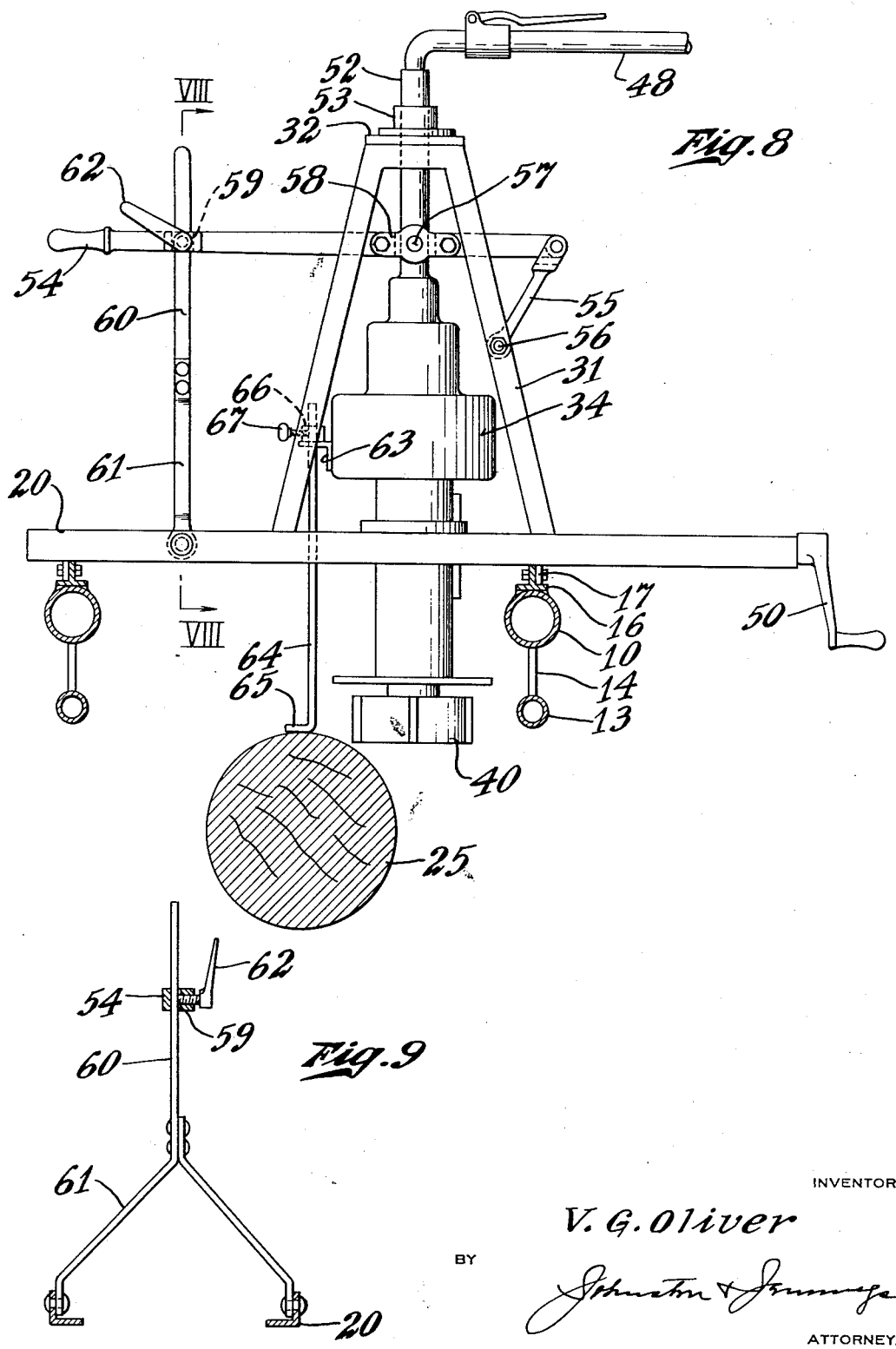
INVENTOR
V. G. Oliver
BY
ATTORNEYS Patented July 25, 1933

1,919,249

UNITED STATES PATENT OFFICE

VAUGHN G. OLIVER, OF BIRMINGHAM, ALABAMA

POLE GAINING MACHINE

Application filed September 21, 1931. Serial No. 563,963.

My invention relates to an apparatus for cutting gains, mortices or seats in poles and the like, adapted to receive cross arms. My invention is more particularly designed and adapted for cutting gains in telephone, telegraph and power line poles.

It is an important feature in the production of poles of the character above described, that the gains cut therein should lie in true parallelism so that the cross arms will all stand in correct relative position. This is rendered difficult by reason of the irregular size and shape of the poles. I have conceived that this object can be attained by a relatively light and inexpensive apparatus adapted to be quickly clamped in operating position on the pole and when thus applied to insure that all of the gains or seats cut therein shall be in true parallelism and all substantially normal to the long axis of the pole.

To accomplish this end, my invention comprises a light skeleton frame work of piping or structural iron carrying at its ends transversely adjustable pole centering clamps capable of being readily applied to the pole so as to grip the latter and hold the frame in horizontal position substantially parallel with and centrally disposed over the long axis of the pole. Upon this frame I mount adjustable guides adapted to be spaced on the desired centers required for the gains and each opposing pair adapted to guide a transversely movable frame carrying a vertically adjustable motor driven cutter, the blades of which preferably turn in a horizontal plane and the diameter of which defines the width of the gain or seat.

The motor driven cutter being readily adjustable vertically, the depth of the gain or cut can be controlled and in order that it may accommodate itself to irregularities in the pole, the cutter head carries a gage which when caused to engage the pole will hold the cutter head in position to cut a gain or seat of the desired depth. These gages are adjustable so that the depth of the gains can be regulated.

My invention also contemplates organizing the frame out of light skeleton side truss members carrying end projections upon which a stop is adjustably mounted and disposed to engage the end of the pole upon which the machine is mounted. By this means the gains are commenced at the desired distance from the top of the pole which can be maintained as a standard.

My invention further contemplates equipping the transversely movable cutter frame if desired with a feed screw shaft adapted to engage the guides for the frame and by coaction therewith to feed the frame transversely across the pole.

My invention further contemplates that the motor and its frame shall be light and portable so that it can be readily lifted from engagement with one pair of guides into engagement with the next pair of guides, whereby it is possible, having adjusted the end stop and the cutter frame guides, to insure the regular and uniform treatment of a plurality of poles without requiring skillful handling or measuring of any kind on the part of the operator.

My invention further comprises the novel details of construction and arrangement of parts which in their preferred embodiment only are illustrated in the accompanying drawings which form a part of the specification, and in which:

Fig. 1 is a plan view of my improved apparatus, the arrow indicating the motion of travel of the cutter frame in cutting a gain;

Fig. 2 is a side elevation of Fig. 1, broken away;

Fig. 3 is a vertical cross sectional view enlarged, taken on the line III—III of Fig. 2;

Fig. 4 is a vertical sectional view taken along the line IV—IV of Fig. 3, showing the motor, cutter and post in side elevation;

Fig. 5 is a detail cross sectional view of the feed screw and its coacting guide and screw element on the frame;

Fig. 6 is a sectional view taken on the line VI—VI of Fig. 5;

Fig. 7 is an end detail view of the pole centering clamp and its frame support;

Fig. 8 is an enlarged view in side elevation of a modified method of adjusting and manipulating the cutter head and motor so as to set it quickly and accurately to its work; and
Fig. 9 is a cross sectional view taken on the line IX—IX of Fig. 8.

Similar reference numerals refer to similar parts throughout the drawings.

In the preferred embodiment of my invention illustrated, I show a light skeleton frame work comprising pipe members 10 disposed in spaced parallel relation and connected at their ends to cross plates 11. These pipes are braced together at intervals by tubular cross members 12 and below each pipe is mounted a smaller pipe or tubular member 13 braced thereto by vertically spaced members 14 and angled end braces 15 so as to produce a light trussed frame on each side. I mount on top of the upper pipes, T-irons 16 which extend from end to end thereof between the plates 11 and these T-irons are drilled so that guide plates 17 can be attached thereto on any desired centers, each guide plate having an upwardly projecting guide portion 18 which is adapted to coact with the threads on the feed screw 19 which is carried by the cutter frame 20.

The end plates 11 of the frame rest on the pole and each carries bearings 21 in which a reversely threaded screw 22 is mounted, the screw being operable by crank 23 and having dependent from its reversely threaded portions a pair of clamp jaws 24 which are adapted to receive between them and to grip a pole 25. By manipulating the screws 22 the frame can be quickly centered over the pole and caused to rigidly hold the frame in the desired operating position.

The lower pipes 13 project at each end beyond the plates 11 and are adapted to receive a cross bar 26 which can be set in adjusted positions on these pipes by means of set screws 27 and which depends sufficiently to engage the end of the pole to serve as a stop or gage for accurately positioning the frame relative to the end of the pole. These pipes also serve as convenient handles for transporting and handling the frame.

The cutter frame 20 is formed of angle irons with their horizontal flanges disposed at the bottom of the frame and to each end of the frame is connected a pair of guide bars 28 which at their inner ends are connected to the guide collar 29 (Fig. 5). This collar carries arms 30, by means of which it is attached to the side members of the frame 20 so as to hold it rigidly in position at the center thereof. A pair of guide bars 28 are mounted between this collar and each end of the frame 20, and each pair of guides is adapted to receive between them and to engage a guide 18 so as to confine the movements of the frame 20 to a direction normal to the long axis of the main frame.

At the center of the frame 20 I mount inclined upright angle members 31 which connect at their top to the plate 32 and these are cross braced at 33 to provide a rigid structure for the support of the motor 34 which drives the cutting tool.

The motor 34 has a threaded top extension 35 which passes freely through the plate 32 and is in threaded engagement with a sleeve 36 bearing a crank 37 and a toothed wheel 38, which by coaction with the spring pressed dog 39 will serve to hold the sleeve 36 in any desired position. The motor drives the cutter head 40 which is mounted on a vertical shaft 41 turning in a sleeve 42 rigidly connected to the motor casing and slidable through the collar 29, the sleeve carrying a key 43 to withstand the torsion and hold the motor and its adjusting screw 35 against rotation.

This sleeve 42 at its lower end carries a plate 44 which extends beyond the cutter head and at each end has holes for the passage of a pair of studs 45 which are rigidly secured in cross stop bars 46, each bar carrying a pair of these screws which are engaged above and below the plate 44 by nuts so that the stop bars can be set in any desired adjustment relative to the plate 44 and the cutter head 40. They will thus, as seen more clearly in Fig. 4, gauge the depth of the cut to be made in the pole by the cutter head as it is moved transversely over the pole from either side.

The motor may be of any suitable type, that shown being an air motor with throttle lever 47 and an air inlet hose 48 which enters between the frame members 31 and will follow the vertical adjustments of the motor therein.

The frame 20 carrying the feed screw 19 is operable by crank 50, the screw being journaled in a bearing 51 mounted in the center of one end of the frame 20 and at its inner end it is mounted in the collar 29 (see Fig. 5).

The cutter head is of the rotary type with vertically disposed knives adapted as they rotate to cut a seat or gain of the proper width desired to receive a cross arm.

In operation, the main frame is lifted by the rods 13 and placed upon the pole to be gained. The cranks 23 are then turned to cause the arms 24 to grip the pole with the frame horizontal and centered thereover. These clamps are applied after the frame has been set in proper adjustment by bringing the cross stop 26 into engagement with the end of the pole.

The pairs of guides 17 having then been bolted in correct position to center the gains to be cut in the pole, the apparatus is ready for the frame 20 to be set in place opposite the first cut to be made. This is done by lifting the frame 20 onto the main frame with the guide bars 28 engaging the initial pair of guides 18. The gauge plates or bars 46 having been set to regulate the depth of cut desired for the gain, the frame is adjusted to bring the motor into position with the cutter head at one side of the pole and with one end of the gauge bars 46 in position to engage the top center of the pole.

The dog 39 is thereupon released, the crank 37 is operated to adjust the motor until the gage bars 46 touch the pole, the dog 39 is reset to lock 36, the motor is started, and the crank 50, operating the feed screw, is turned so as to feed the frame 20 as a carriage transversely across the main frame. This causes the cutter to contact with the pole and as it moves across the pole to cut the gain or seat, the depth of the seat being gauged by the bars 46 and the width determined by the diameter of the cutter. The cutter head is readily removable in order that other heads of different diameters may be used to cut different width gains and, as already explained, are adapted to be lowered or raised to vary the depth of the cut.

Having completed this operation without further adjustment of the motor, and unless there is irregularity in the pole, the frame 20 can be lifted into engagement with the next pair of guides 18 and the same operation repeated. If there be irregularity in the pole, it will be necessary where this occurs to readjust the motor vertically for each cutting operation.

The pole may be of square or round stock and my invention is readily applicable to gain either type of pole or any stock requiring similar treatment.

In Figs. 8 and 9, I have shown a modified apparatus which will simplify and expedite the adjustment of the cutter head to different working positions relative to the pole. Here the motor 34 has its compressed air inlet pipe connected to its upper end through a pipe connection 52 which is freely slidable through a guide sleeve 53 fastened on top of the plate 32. Clamped to this pipe 52 is an operating lever 54 which is pivotally connected at one end to the swinging link 55 that in turn is pivoted to a cross rod 56 on the frame members 31.

The lever 54 has a swivel connection to the pipe 52 which is arranged as follows: A pair of bearing pins 57 are rigidly secured in diametrically opposite positions on the pipe 52 and the lever 54 is bent outwardly and is perforated to receive one pin, while a clip 58 is bolted to the lever and passes on the other side of the pipe and receives the opposite pin.

The free end of the lever is formed with a vertical slot 59 through which a bar 60 passes, this bar having a yoke-like base 61 which is pivotally connected to the opposite side angles of the frame 20. I provide a set screw operable by handle 62 which by engaging the bar 60 will clamp the handle in the desired adjusted position.

To gauge the cutter head, I attach an angled clip 63 to the motor and through this clip I drop loosely a gauge bar 64 having its bottom 65 out-turned away from the cutter head. The bar itself is of rectangular stock so that it will not turn in the hole in the clip 63. On the free end of the bar 64 I mount an adjustable collar 66 having a set screw 67 therein which will adjust the position of the end 65 with relation to the bottom edge of the cutter head 40.

In utilizing the apparatus described in Figs. 8 and 9, the operator moves the handle 62 to free the lever and then having determined the desired depth of the cut, to form the gain by the adjustment of the collar 66, the lever 54 is clasped and reciprocated vertically until the gage end 65 strikes the pole in the center of the proposed gain. Thereupon, handle 62 is moved to clamp the lever 54 in such adjusted position and then the carriage is shifted to the left (Fig. 8) by manipulating the crank 50. This will afford a quick and ready adjustment, the lever 54 being locked at the moment that the collar 66 is seen to lift by reason of contact with the pole.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:—

1. A gain cutter for poles, comprising a frame adapted to be clamped to the pole, fixed guides on the frame, and a motor carriage transversely movable under control of said guides and comprising a crank operated feed screw, said guides being adapted to coact with the feed screw to effect a feed of the carriage.

2. A gain cutter for poles comprising a frame, a means for securing the frame to a pole, guides on the frame, a carriage transversely reciprocable on said guides, a motor vertically adjustable in said carriage, a vertical shaft carrying said cutter head and driven by said motor, and a gauge means adjustably mounted on the motor and disposed to engage the pole in advance of the cutter to predetermine the depth of the gain.

3. A gain cutter for poles, comprising a transverse guide means, means to mount the guide means on a pole, a carriage reciprocable on said guide means, a motor vertically adjustable on the carriage, leverage means for vertically adjusting the motor in combination with clamp means to hold the motor in set adjustment, and a rotatable cutter head depending below the motor in position to engage the pole and form a gain therein responsive to transverse movement of the carriage.

4. In a machine of the character described, the combination of a motor driven rotary cutter disposed to turn in a horizontal plane, a gauge element adapted to engage the pole in advance of the cutter, means to vertically adjust the cutter, and means mounted on the pole to guide the cutter transversely in a horizontal plane across the pole to cut the gain.

5. A machine of the character described comprising an elongated frame, means to mount it on the pole, a motor which drives a rotary cutter head in a horizontal plane, a motor carriage transferable to different operating positions on the main frame, guides for the carriage, means to reciprocate the motor carriage, an adjustable gauge working in advance of the cutter head and by engagement with the pole to predetermine the depth of the cut, and means to vertically adjust the motor and gauge to bring the latter into contact with the top of the pole in advance of the cutting operation.

6. A machine of the class described, comprising an elongated frame having an end supporting member adapted to rest on the pole free to shift laterally thereon, and relatively movable grip members connected to the frame and adapted to engage the sides of the pole to clamp the frame in position thereon, and a gaining device arranged to be supported on the frame in different positions spaced lengthwise thereof and movable on the frame for cutting a plurality of parallel gains in the upper side of the pole.

7. A machine of the class described in claim 6, in which the end frame supporting members are flat and the pole gripping members have horizontal rectilinear movement.

8. A machine according to claim 6, in which the end members comprise a level bottom pole engaging surface, and the pole engaging members are adjustably mounted on the end members and adapted to engage the sides of the pole and are movable toward and from each other rectilinearly by means of an actuating screw element.

9. A gain cutter for poles, comprising a main frame formed of trussed side members connected by end plates and cross braces, pole gripping elements carried by the end plates, a gauge bar carried by the side frame members and adjustable thereon to engage the end of the pole, a plurality of pairs of guide lugs adjustable along the frame sides, a cutter frame movable into cooperative relation with any desired pair of said guide lugs, a motor driven gain cutter mounted on said cutter frame, and an adjustable loosely mounted gauge bar carried by the motor and set in advance of the cutter head to engage the pole in the line of the cut.

10. A machine of the class described comprising an elongated frame having portions formed to fit the side of a pole to line up the frame with the pole lengthwise thereof, a gaining device arranged to be supported on the frame in different positions spaced lengthwise thereof for cutting a corresponding number of gains in the side of the pole, and an end member comprising side arms adjustably connected to the sides of the frame and having a straight cross member adapted to engage the ends of the pole.

VAUGHN G. OLIVER.